United States Patent
Lindheimer et al.

(10) Patent No.: US 10,757,635 B2
(45) Date of Patent: Aug. 25, 2020

(54) VALIDITY TIME OF SYSTEM INFORMATION IN A WIRELESS COMMUNICATION SYSTEM

(71) Applicant: Telefonaktiebolaget LM Ericsson (publ), Stockholm (SE)

(72) Inventors: Christofer Lindheimer, Linköping (SE); Pål Frenger, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 4 days.

(21) Appl. No.: 16/090,622

(22) PCT Filed: Mar. 23, 2018

(86) PCT No.: PCT/EP2018/057475
§ 371 (c)(1),
(2) Date: Oct. 2, 2018

(87) PCT Pub. No.: WO2018/172531
PCT Pub. Date: Sep. 27, 2018

(65) Prior Publication Data
US 2019/0261251 A1    Aug. 22, 2019

Related U.S. Application Data

(60) Provisional application No. 62/476,461, filed on Mar. 24, 2017.

(51) Int. Cl.
*H04W 48/10* (2009.01)
*H04W 48/02* (2009.01)
(Continued)

(52) U.S. Cl.
CPC ........... *H04W 48/10* (2013.01); *H04W 48/02* (2013.01); *H04W 48/16* (2013.01); *H04W 88/023* (2013.01); *H04W 88/08* (2013.01)

(58) Field of Classification Search
CPC ... H04W 48/10; H04W 88/08; H04W 88/023; H04W 48/16; H04W 48/02
See application file for complete search history.

(56) References Cited

U.S. PATENT DOCUMENTS 8,169,982 B2    5/2012   Gogic et al.
2010/0272037 A1  10/2010  Lee et al.
(Continued)

FOREIGN PATENT DOCUMENTS

RU     2384982 C2     3/2010
WO   2016162329 A1   10/2016

OTHER PUBLICATIONS

Gemalto N.V., "System Information for NR validity considerations including area ID introduction", 3GPP TSG-RAN WG2 NR, Spokane, Washington, US, R2-1700034, Jan. 17, 2017, pp. 1-4, 3GPP.
(Continued)

*Primary Examiner* — Hashim S Bhatti
(74) *Attorney, Agent, or Firm* — Coats + Bennett, PLLC

(57) ABSTRACT

A user equipment (14) is configured for use in a wireless communication system (10). The user equipment (14) is configured to receive system information (16) and a value tag (18) indicating a version of the system information (16). The value tag (18) is associated with a validity time period (20) for which the version of the system information (16) is deemed valid. The value tag (18) is one of multiple different possible value tags. At least two of the different possible value tags are respectively associated with different possible validity time periods.

12 Claims, 14 Drawing Sheets

(51) Int. Cl.
*H04W 48/16* (2009.01)
*H04W 88/02* (2009.01)
*H04W 88/08* (2009.01)

(56) References Cited

U.S. PATENT DOCUMENTS

| | | | |
|---|---|---|---|
| 2016/0198406 A1 | 7/2016 | Hoglund et al. | |
| 2016/0212686 A1 | 7/2016 | Viorel et al. | |
| 2018/0049022 A1* | 2/2018 | Johansson | H04W 8/24 |
| 2018/0132166 A1* | 5/2018 | Ishii | H04W 48/12 |
| 2019/0159110 A1* | 5/2019 | Takahashi | H04W 48/14 |

OTHER PUBLICATIONS

Ericsson, "Index based provisioning of system information in NR", 3GPP TSG-RAN WG2 NR Ad Hoc, Spokane, USA, Jan. 17, 2017, pp. 1-4, R2-1700476, 3GPP.

Mediatek Inc., "Comparison of Methods for Stored System Information", 3GPP TSG-RAN2 #97 Meeting, Athens, Greece, Feb. 13, 2017, pp. 1-4, R2-1701326, 3GPP.

Ericsson, "Stored system information ", Discussion, Decision, 3GPP TSG-RAN WG2 Meeting #NR AH 1801, Vancouver, Canada, Jan. 22, 2017, pp. 1-5, R2-180315 (revision of R2-180285), 3GPP.

Ericsson, "Change of System information in NR", Discussion, Decision, 3GPP TSG-RAN WG2 #97bis, Spokane, USA, Apr. 3, 2017, pp. 1-2, R2-1702861, 3GPP.

3rd Generation Partnership Project, "3rd Generation Partnership Project; Technical Specification Group Radio Access Network; Evolved Universal Terrestrial Radio Access (E-UTRA) Radio Resouce Control (RRC); Protocol specification (Release 14)", Technical Specification, 3GPP TS 36.331 V14.0.0, Sep. 1, 2016, pp. 1-292, 3GPP, France.

Ericsson, "Stored System information," Discussion, Decision, 3GPP TSG-RAN WG2 #97bis, Spokane, USA, Apr. 3, 2017, pp. 1-5, R2-1702858, 3GPP.

* cited by examiner

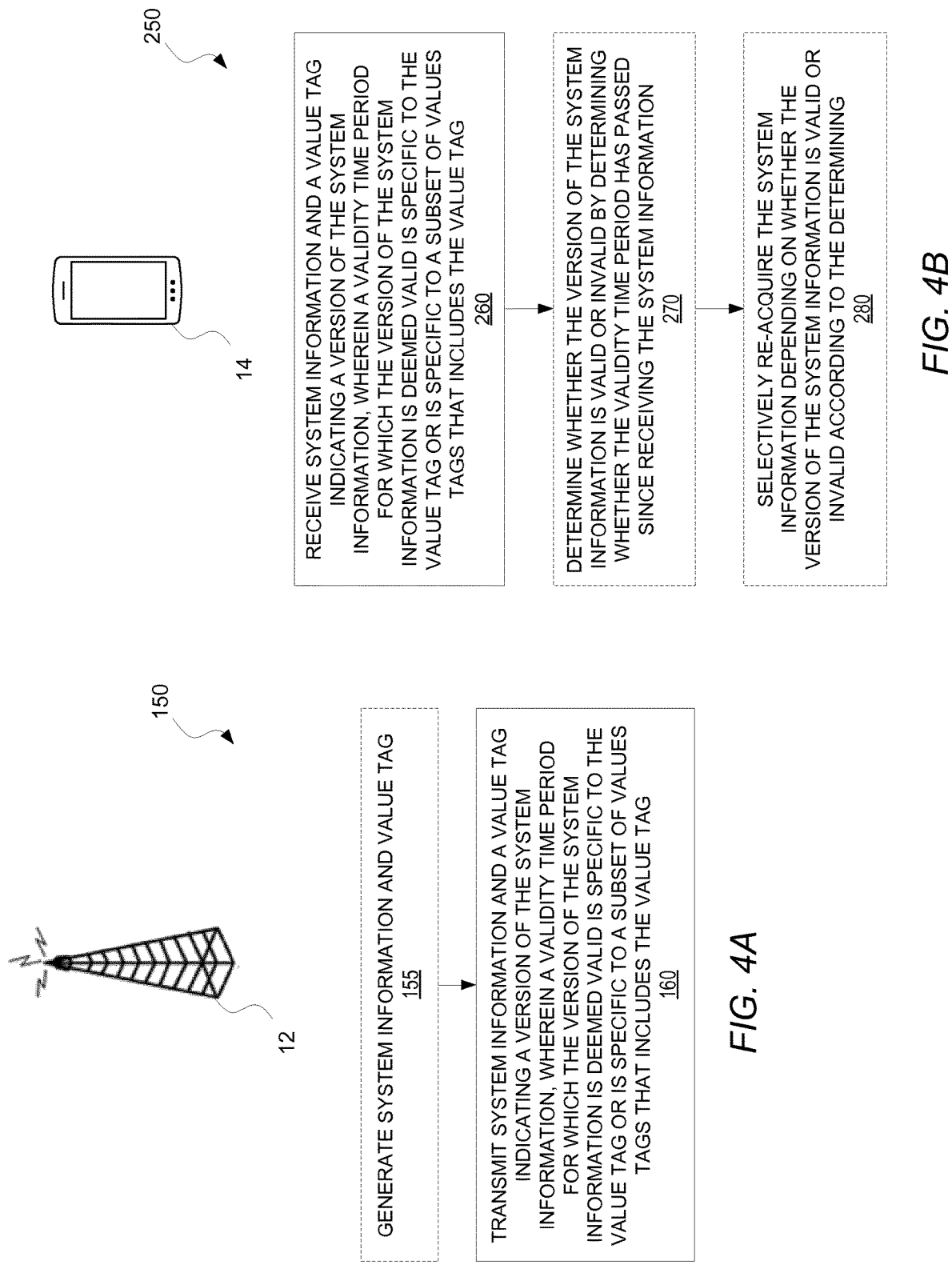

| MIB – valueTag | SI configuration | UE ValidityTime |
|---|---|---|
| 0 | A | 3 hours |
| 1 | B | 3 hours |
| 2 | C | 3 hours |
| 3 | D | 3 hours |
| 4 | E | 3 hours |
| ... | | 3 hours |
| ... | | 3 hours |
| 31 | AF | 3 hours |

FIG. 10

| MIB – valueTag | SI configuration | UE ValidityTime |
|---|---|---|
| 0 | A | 10 seconds |
| 1 | B | 10 seconds |
| 2 | C | 1 minute |
| 3 | D | 1 minute |
| 4 | E | 10 minutes |
| 5 | F | 10 minutes |
| 6 | G | 3 hours |
| 7 | H | 3 hours |
| ... | | |
| 31 | AF | 3 hours |

*FIG. 11*

VALIDITY TIME OF SYSTEM INFORMATION IN A WIRELESS COMMUNICATION SYSTEM

TECHNICAL FIELD

The present application relates generally to a wireless communication system, and relates more particularly to the validity time of system information in such a wireless communication system.

BACKGROUND

A wireless communication system broadcasts so-called system information to wireless communication devices in order to assist those devices with operating in the system. System information may include, for example, parameters that describe general information about the system, including the Public Land Mobile Network (PLMN) ID, the system bandwidth, and the like. System information may also include parameters that describe information specific to certain cells in the system, such as the allocation of control channels, paging channel information, cell selection information, and so on.

System information may change from time to time. Known approaches effectively inform devices about such a change by embedding a value tag in the block or message that includes system information. A device reads the block or message in order to check the value tag. If the value tag has changed, the device considers the system information in the block or message to have changed and continues on with reading the system information in the block or message. If the value tag has not changed, the device only reads the system information in the block or message if at least a predefined validity time has passed since the device last read the system information from the block or message.

Known approaches, however, inherently impose limitations on how often the system information may be changed and still be read by a wireless communication device. This may prove problematic in some contexts where system information changes frequently. Adding more value tags would allow more frequent system information changes, but would unacceptably increase signalling overhead.

SUMMARY

According to one or more embodiments, at least two different possible value tags for system information are respectively associated with different possible validity time periods, e.g., rather than all possible value tags being associated with the same validity time period. The time period for which a user equipment deems system information (e.g., included in a block or message) valid, therefore, may depend on which value tag the user equipment receives with that system information. In some embodiments, for instance, a table at the user equipment respectively maps at least two of the different possible value tags to different possible validity time periods. With different validity time periods associated with at least some of the different value tags, some embodiments permit more frequent system information changes for the same amount of signaling overhead attributable to value tag transmission.

More particularly, some embodiments herein include a method performed by a user equipment configured for use in a wireless communication system. The method comprises receiving system information and a value tag indicating a version of the system information. The value tag is associated with a validity time period for which the version of the system information is deemed valid. The value tag is one of different possible value tags. At least two of the different possible value tags are respectively associated with different possible validity time periods.

In some embodiments, the method further comprises, responsive to receiving the system information and the value tag, storing the version of the system information. The method may also comprise determining whether the stored version of the system information t is valid or invalid by determining whether the validity time period has passed since storing the version of the system information. The method may further comprise selectively re-acquiring the system information depending on whether the stored version of the system information component is valid or invalid according to the determining.

In some embodiments, a table at the user equipment maps each different possible value tag to one of the different possible validity time periods, wherein at least two of the different possible value tags are respectively mapped to different possible validity time periods.

Embodiments also comprise a method performed by a radio network node configured for use in a wireless communication system. The method comprises transmitting system information and a value tag indicating a version of the system information. The value tag is associated with a validity time period for which the version of the system information is deemed valid. The value tag is one of different possible value tags. At least two of the different possible value tags are respectively associated with different possible validity time periods.

In some embodiments, the method further comprises selecting the value tag, from among the different possible value tags, based on how frequently the system information component is to be updated.

In some embodiments, a table at the radio network node maps each different possible value tag to one of the different possible validity time periods, wherein at least two of the different possible value tags are respectively mapped to different possible validity time periods.

In any of the above embodiments at the user equipment or radio network node, at least two different possible value tags may be associated with the same possible validity time period.

In any of the above embodiments, the system information is included in minimum system information or a master information block. Alternatively, the system information may be included in other system information than minimum system information or in a system information block. In still other embodiments, the system information is included in a system information message.

Embodiments also include corresponding apparatus, computer programs, and carriers (E.g., non-transitory computer-readable mediums).

For example, embodiments include a user equipment configured for use in a wireless communication system. The user equipment is configured to receive system information and a value tag indicating a version of the system information. The value tag is associated with a validity time period for which the version of the system information is deemed valid. The value tag is one of different possible value tags. At least two of the different possible value tags are respectively associated with different possible validity time periods.

Embodiments also include a radio network node configured for use in a wireless communication system. The radio network node is configured to transmit system information and a value tag indicating a version of the system information. The value tag is associated with a validity time period for which the version of the system information is deemed valid. The value tag is one of different possible value tags. At least two of the different possible value tags are respectively associated with different possible validity time periods.

BRIEF DESCRIPTION OF THE DRAWINGS

FIG. 4A is a logic flow diagram of a method performed by a radio network node according to other embodiments.

FIG. 4B is a logic flow diagram of a method performed by a user equipment according to other embodiments.

FIG. 10 is a table of value tags according to some embodiments.

FIG. 11 is a table of value tags, with at least some value tags associated with different validity time periods, according to some embodiments.

DETAILED DESCRIPTION

Figure 1:
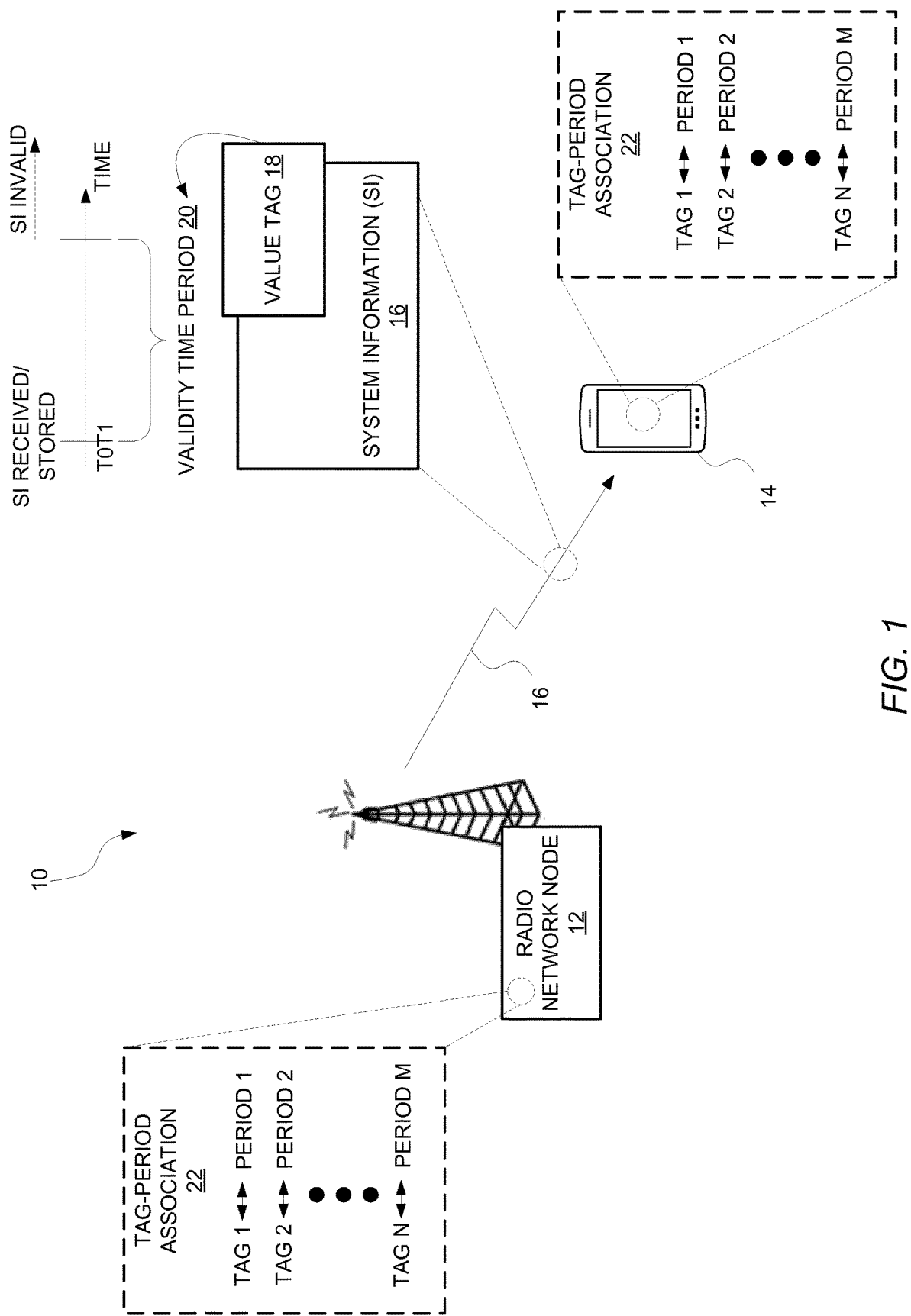
FIG. 1 is a block diagram of a wireless communication system that includes a radio network node and a user equipment according to some embodiments.

FIG. 1 illustrates a radio network node 12 and a user equipment 14 in a wireless communication system 10, e.g., a 5G system. The radio network node 12 transmits (e.g., broadcasts) so-called system information (SI) 16 to the user equipment 14 in order to assist the user equipment 14 with operating in the system 10. System information 16 may include, for example, parameters that describe general information about the system 10, including the Public Land Mobile Network (PLMN) ID, the system bandwidth, and the like. System information 16 may additionally or alternatively include parameters that describe information specific to certain cells in the system 10, such as the allocation of control channels, paging channel information, cell selection information, and so on.

The system information 16 may change from time to time. The radio network node 12 notifies the user equipment 14 about such changes. The radio network node 12 in this regard effectively informs the user equipment 14 about such a change by transmitting a value tag 18, e.g., which may be embedded in or otherwise associated with the system information 16 as shown in FIG. 1. A value tag 18 associated with system information 16 indicate a version of that system information 16. A change in system information 16 therefore yields a different version of that system information, as indicated by the value tag 18. For example, the value tag 18 may be incremented each time the system information 16 is changed. In some embodiments, the user equipment 14 reads (and stores) the version of the system information 16 indicated by the value tag 18 if the value tag 18 has changed since the user equipment 14 last read (and stored) the system information 16. If the value tag 18 has not changed, the user equipment 14 may not read or store the system information 16, e.g., on the assumption that the user equipment 14 has already previously stored that version of the system information 16.

According to some embodiments herein, though, the value tag 18 not only indicates a version of the system information 16 but is also associated with a validity time period 20 for which that version of the system information 16 is deemed valid. The user equipment 14 in this case considers the version of the system information 16 valid for a validity time period 20. When the version of the system information 16 becomes invalid after expiration of the validity time period 20, the user equipment 14 may re-read (and re-store) the system information 16 even if the value tag 18 has not changed.

For example, responsive to receiving the system information 16 and the value tag 18, the user equipment 14 may store the version of the system information 16 indicated by the value tag 18. FIG. 1 for instance shows that the user equipment 14 receives and/or stores the system information 16 at time T0. The user equipment 14 may also start a timer or countdown for determining how much time has passed since the user equipment 14 received and/or stored the version of the system information 16. When the validity time period 20 expires (e.g., as of time T1 in FIG. 1), the user equipment 14 re-acquires the system information 16. The user equipment 14 may thereby (e.g., occasionally or periodically) determine whether the stored version of the system information 16 is valid or invalid by determining whether the validity time period 20 has passed since storing the version of the system information 16, and selectively re-acquire the system information 16 depending on whether the stored version of the system information 16 is valid or invalid according to that determination.

The value tag 18 in some embodiments is one of different possible value tags. Notably, at least two of the different possible value tags are respectively associated with different possible validity time periods. FIG. 1 for instance shows that a tag-period association 22 at or obtainable by the user equipment 14 and/or radio network node 12 (e.g., in the form of a table) may map each of N different possible value tags 1, 2, . . . N to one of M different possible validity time periods 1, 2, . . . M, where N≥2 and M≥2. N may be equal to M in some embodiments, whereas in other embodiments N may not be equal to M. In one embodiment, for example, N>M such that only some of the N different possible value tags are mapped to different possible validity time periods. That is, at least two of the N different possible value tags are respectively mapped to different possible validity time periods and at least two of the N different possible value tags are respectively mapped to the same possible validity time period. In these and other embodiments, then, the validity time period for which a version of the system information 16 is deemed valid may in a sense be considered specific to the value tag 18 indicating that version or specific to a subset of value tags that includes the value tag 18 (e.g., where the value tags in the subset are all associated with the same validity time period).

In any event, the radio network node 12 in these embodiments may control the time period for which the user equipment 14 deems a version of system information 16 valid by selecting which value tag to use to indicate that version of system information 16. The radio network node 12 may for instance select tag 1 to control the user equipment 14 to deem a version of system information 16 valid for time period 1, select tag 2 to control the user equipment 14 to instead deem the version of system information 16 valid for time period 2, etc.

With different validity time periods associated with at least some of the different value tags, some embodiments flexibly account for situations in which system information is to be rarely updated (e.g., such that a longer validity time period is appropriate) as well as for situations in which system information is to be more frequently updated (e.g., such that a shorter validity time period is appropriate). The radio network node 12 may for instance select the value tag 18 to use, from among the different possible value tags, based on how frequently the system information 16 is to be updated. The radio network node 12 may select a value tag associated with a relatively shorter validity time period if the system information 16 is to be updated more frequently, but select a different value tag associated with a relatively longer validity time period if the system information 16 is to be updated less frequently.

Alternatively or additionally, some embodiments advantageously permit more frequent system information changes than known approaches, e.g., for the same amount of signaling overhead attributable to value tag transmission. For example, a value tag may have the same number of bits as in known approaches, yet allow for more frequent system information changes since at least some value tags are associated with different validity time periods.

Note that the system information 16 in FIG. 1 may be any component of system information. A component of system information is any part or portion of system information, at any granularity or resolution. As shown in FIG. 2A, for example, the system information 16 of FIG. 1 may be a system information message 16A that includes one or more system information blocks (SIBs) 24. An SIB 24 may group together system information (e.g., in the form of information elements) that are of the same nature. A system information message 16A may thereby serve as a container for one or more SIBs. In some embodiments, the value tag 18 is associated with the system information message 16A and indicates a version of the system information message 16A, e.g., on a message by message basis, not an SIB by SIB basis. In these embodiments, then, the user equipment 14 may store the value tags of system information messages it reads. Upon reading new system information later, the user equipment 14 can compare the value tags included in the new system information and conclude whether a change has taken place in any system information messages that are of interest and thus if reading of broadcast information is necessary.

Figure 2B:
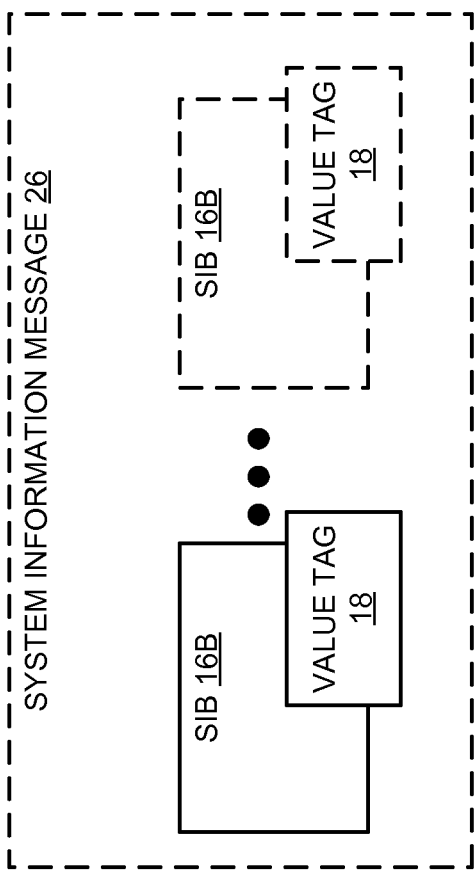
FIG. 2B is a block diagram of system information and a value tag according to other embodiments.

In other embodiments shown in FIG. 2B, the system information 16 of FIG. 1 may be an SIB 16B, e.g., included in a system information message 26. In this case, the value tag 18 is associated with an SIB 16B and indicates a version of the SIB 16B, e.g., on an SIB by SIB basis. As shown, for instance, different value tags 18 may be associated with different SIBs (e.g., included in the same system information message) to indicate respective versions of those SIBs.

Figure 2D:
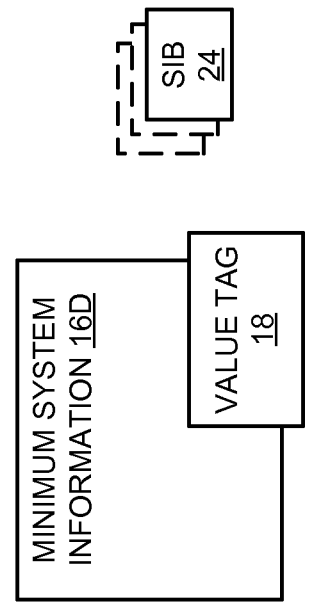
FIG. 2D is a block diagram of system information and a value tag according to yet other embodiments.
Figure 2A:
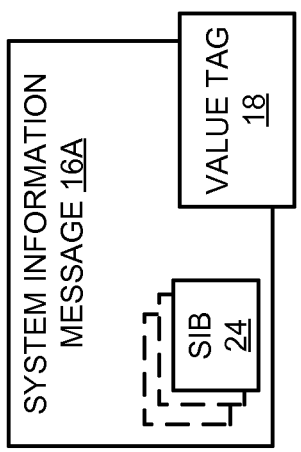
FIG. 2A is a block diagram of system information and a value tag according to some embodiments.
Figure 2C:
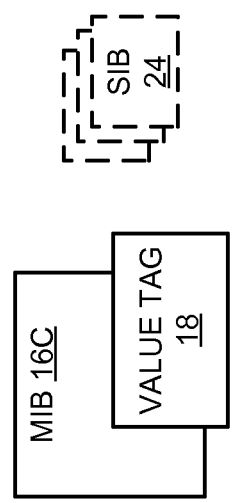
FIG. 2C is a block diagram of system information and a value tag according to still other embodiments.

In still other embodiments, the system information 16 of FIG. 1 may be a master information block (MIB) 16C as shown in FIG. 2C. In this case, the value tag 18 is associated with the MIB 16C and indicates a version of the MIB 16C. An MIB 16C may include, for example, parameters that describe general information about the system 10, including the Public Land Mobile Network (PLMN) ID, the system bandwidth, and the like. This may be distinguished from other SIBs 24 that include for instance parameters that describe information specific to certain cells in the system 10, such as the allocation of control channels, paging channel information, cell selection information, and so on.

In yet other embodiments, the system information 16 of FIG. 1 may be minimum system information 16D (e.g., in a 5G New Radio system) as shown in FIG. 2D. In this case, the value tag 18 is associated with the minimum system information 16D and indicates a version of the minimum system information 16D. Minimum system information 16D may include, for example, parameters that describe general information about the system 10, including the Public Land Mobile Network (PLMN) ID, the system bandwidth, and the like. This may be distinguished from other system information (e.g., in the form of SIBs 24) that include for instance parameters that describe information specific to certain cells in the system 10, such as the allocation of control channels, paging channel information, cell selection information, and so on. In still other embodiments not shown, the system information 16 may be such other system information such that a value tag 18 associated with the other system information indicates a version of the other system information.

Figure 3A:
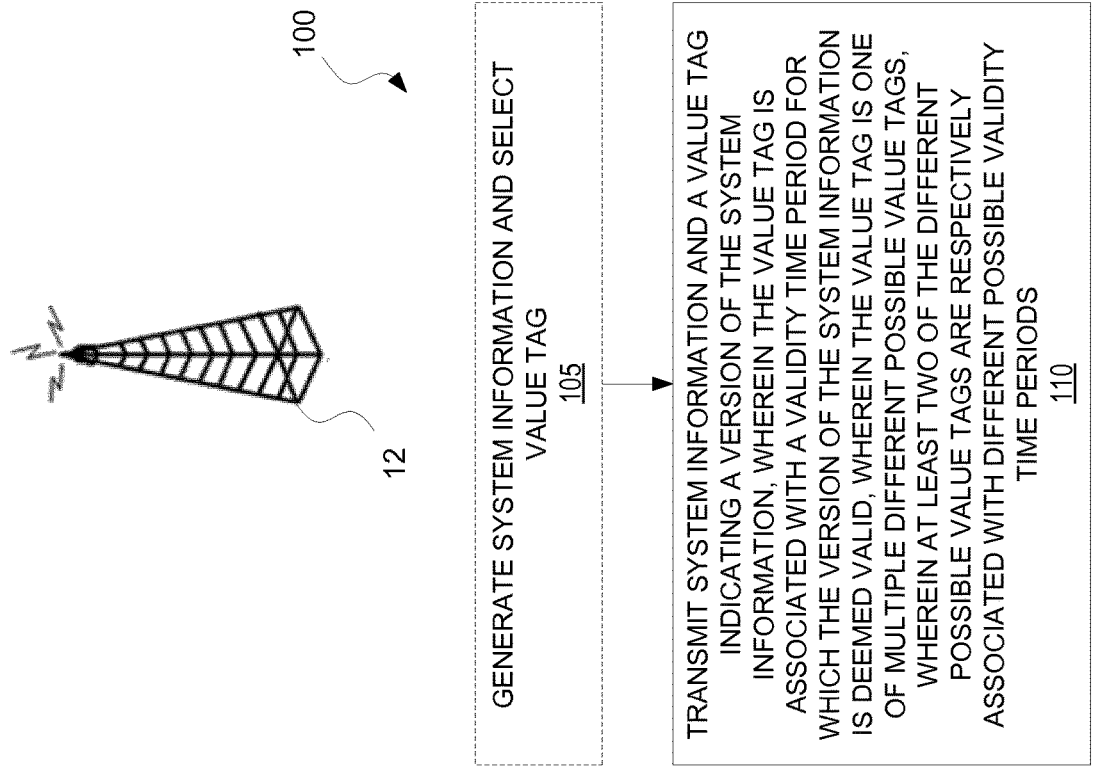
FIG. 3A is a logic flow diagram of a method performed by a radio network node according to some embodiments.

In view of the above modifications and variations, FIG. 3A illustrates a method 100 performed by a radio network node 12 configured for use in a wireless communication system 10 according to some embodiments. As shown, the method 100 includes transmitting system information 16 and a value tag 18 indicating a version of the system information 16 (Block 110). The value tag 18 is associated with a validity time period 20 for which the version of the system information 16 is deemed valid. The value tag 18 is one of multiple different possible value tags. At least two of the different possible value tags are respectively associated with different possible validity time periods. In some embodiments, the method 100 may further comprise generating the system information 16 and selecting the value tag 16 (Block 105).

Figure 3B:
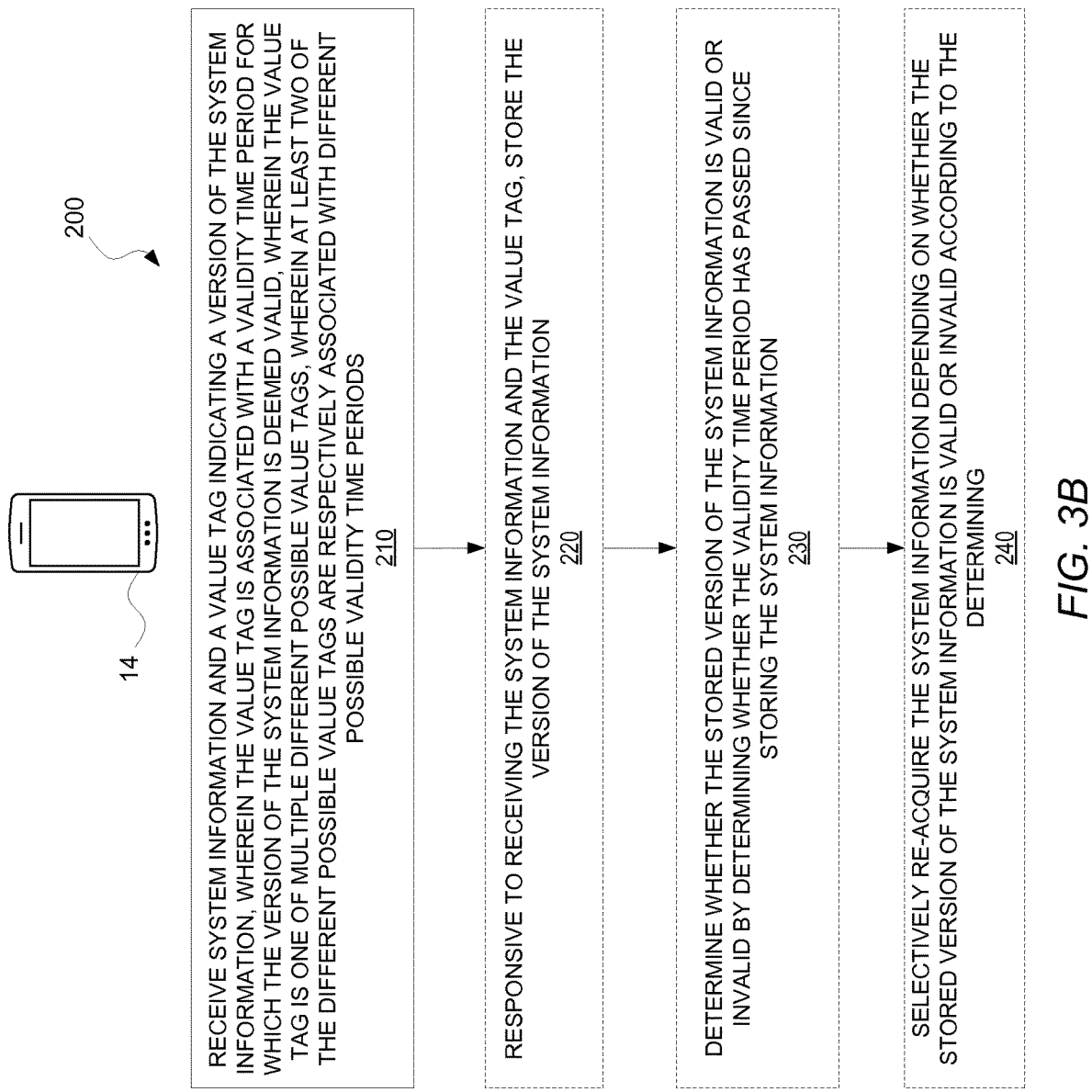
FIG. 3B is a logic flow diagram of a method performed by a user equipment according to some embodiments.

FIG. 3B illustrates a corresponding method 200 performed by a user equipment 14 configured for use in a wireless communication system 10 according to some embodiments. As shown, the method 200 includes receiving system information 16 and a value tag 18 indicating a version of the system information 16 (Block 210). The value tag 18 is associated with a validity time period 20 for which the version of the system information 16 is deemed valid. The value tag 18 is one of multiple different possible value tags. At least two of the different possible value tags are respectively associated with different possible validity time periods.

In some embodiments, the method 200 may further comprise, responsive to receiving the system information 16 and the value tag 18, storing the version of the system information 16 (Block 220). The method 200 may also comprise (e.g., occasionally or periodically) determining whether the stored version of the system information 16 is valid or invalid by determining whether the validity time period 20 has passed since storing the version of the system information 16 (Block 230). The method 200 may further comprise selectively re-acquiring the system information 16 depending on whether the stored version of the system information 16 is valid or invalid according to the determining (Block 240).

FIG. 4A illustrates a method 150 performed by a radio network node 12 configured for use in a wireless communication system 10 according to other embodiments. As shown, the method 150 includes transmitting system information 16 and a value tag 18 indicating a version of the system information 16 (Block 160). A validity time period 20 for which the version of the system information 16 is deemed valid is specific to the value tag 18 or is specific to a subset of value tags that includes the value tag 18. In some embodiments, the method 150 may further comprise generating the system information 16 and the value tag 16 (Block 155).

FIG. 4B illustrates a corresponding method 250 performed by a user equipment 14 configured for use in a wireless communication system 10 according to some embodiments. As shown, the method 250 includes receiving system information 16 and a value tag 18 indicating a version of the system information 16 (Block 260). A validity time period 20 for which the version of the system information 16 is deemed valid is specific to the value tag 18 or is specific to a subset of value tags that includes the value tag 18.

In some embodiments, the method 250 may further comprise (e.g., occasionally or periodically) determining whether the version of the system information 16 is valid or invalid by determining whether the validity time period 20 has passed since receiving the system information 16 (Block 270). The method 250 may further comprise selectively re-acquiring the system information 16 depending on whether the version of the system information 16 is valid or invalid according to the determining (Block 280).

Some embodiments will now be described in certain contexts to provide more concrete examples of those embodiments.

For the 5G system currently being standardized by 3GPP (where the radio access network is referred to as New Radio (NR) and the core network is referred to as Next Generation Core (NGC)), 3GPP has agreed to partly change the principles for distribution of system information (SI) that are used in Long Term Evolution (LTE).

In LTE, system information is specified in 3GPP TS 36.331. According to the 3GPP specification for LTE, a change in system information only occurs at specific radio frames, i.e. the concept of a modification period is used. System information may be transmitted a number of times with the same content within a modification period, as defined by its scheduling.

Figure 5:
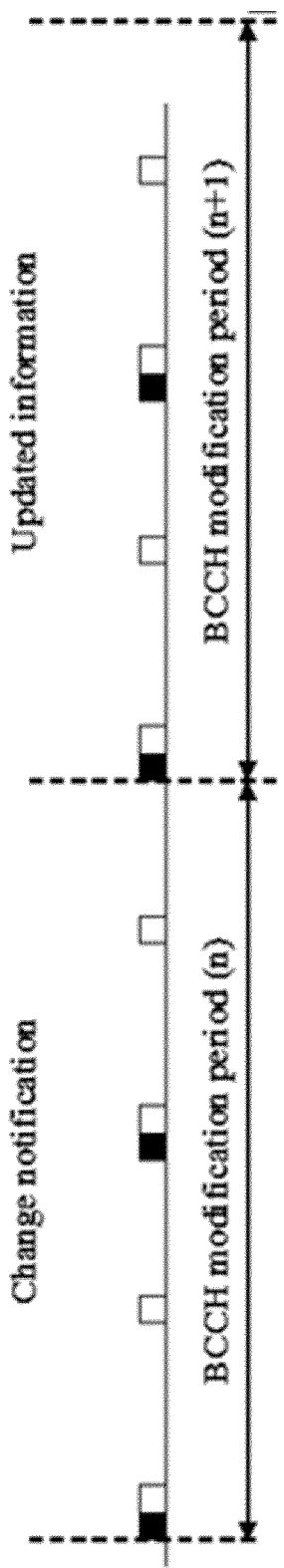
FIG. 5 is a block diagram of modification periods according to which system information is changed according to some embodiments.

When the network changes at least some of the system information transmitted on the broadcast control channel (BCCH), the network first notifies the user equipments (UEs) about this change and then subsequently starts to transmit updated system information. FIG. 5 for instance shows that the network transmits a change notification in BCCH modification period n and then starts transmitting updated system information in the next BCCH modification period n+1. When the UE receives the change notification, the UE acquires the new system information in the next modification period. The UE applies the previously acquired system information until the UE acquires the new system information.

A Paging message is used to inform UEs in Radio Resource Control (RRC) idle mode (RRC_IDLE), UEs in RRC connected mode (RRC_CONNECTED), or UEs in RRC inactive mode (RRC_INACTIVE) about a system information change. If the UE is in RRC_CONNECTED and receives a Paging message including the systemInfoModification information element (IE), it knows that the system information will change at the next modification period boundary.

In LTE, the SystemInformationBlockType1 (or MasterInformationBlock-NB for Narrowband IoT (internet of Things UE's)) includes a value tag, systemInfoValueTag, that indicates if a change has occurred in the SI messages. UEs may use systemInfoValueTag, e.g. upon return from out of coverage, to verify if previously stored SI messages are still valid. The UE considers stored system information to be invalid after 3 hours from the moment it was successfully confirmed as valid, unless specified otherwise. Specific types of UEs can even consider stored system information to be valid for 24 hours from the moment it was successfully confirmed as valid. The UE can also be configured with a parameter si-ValidityTime that can change this 24-hours to 3 hours instead. After this duration, the stored system information shall be updated via new SI acquisition.

For certain types of UE's, e.g., NB-IoT UE's, change of specific system information messages can also be indicated by another valueTag, systemInfoValueTagSI. If systemInfoValueTag is included in the SystemInformationBlockType1-BR (or MasterInformationBlock-NB in NB-IoT) and is different from the one of the stored system information and if systemInfoValueTagSI is included in the SystemInformationBlockType1-BR (or SystemInformationBlockType1-NB in NB-IoT) for a specific SI message and is different from the stored one, the UE shall consider this specific SI message to be invalid. If only systemInfoValueTag is included and is different from the stored one, some UE's should consider any stored system information to be invalid, with some exceptions, as specified in 3GPP TS 36.331.

The network can choose to not update systemInfoValueTag upon change of some system information and it can also choose to not include an indication of modification in a paging message if some system information is changed. This relates in particular to regularly changing information. The result of this may be that the UE that has stored system information may not anyway have the latest system information.

Figure 6:
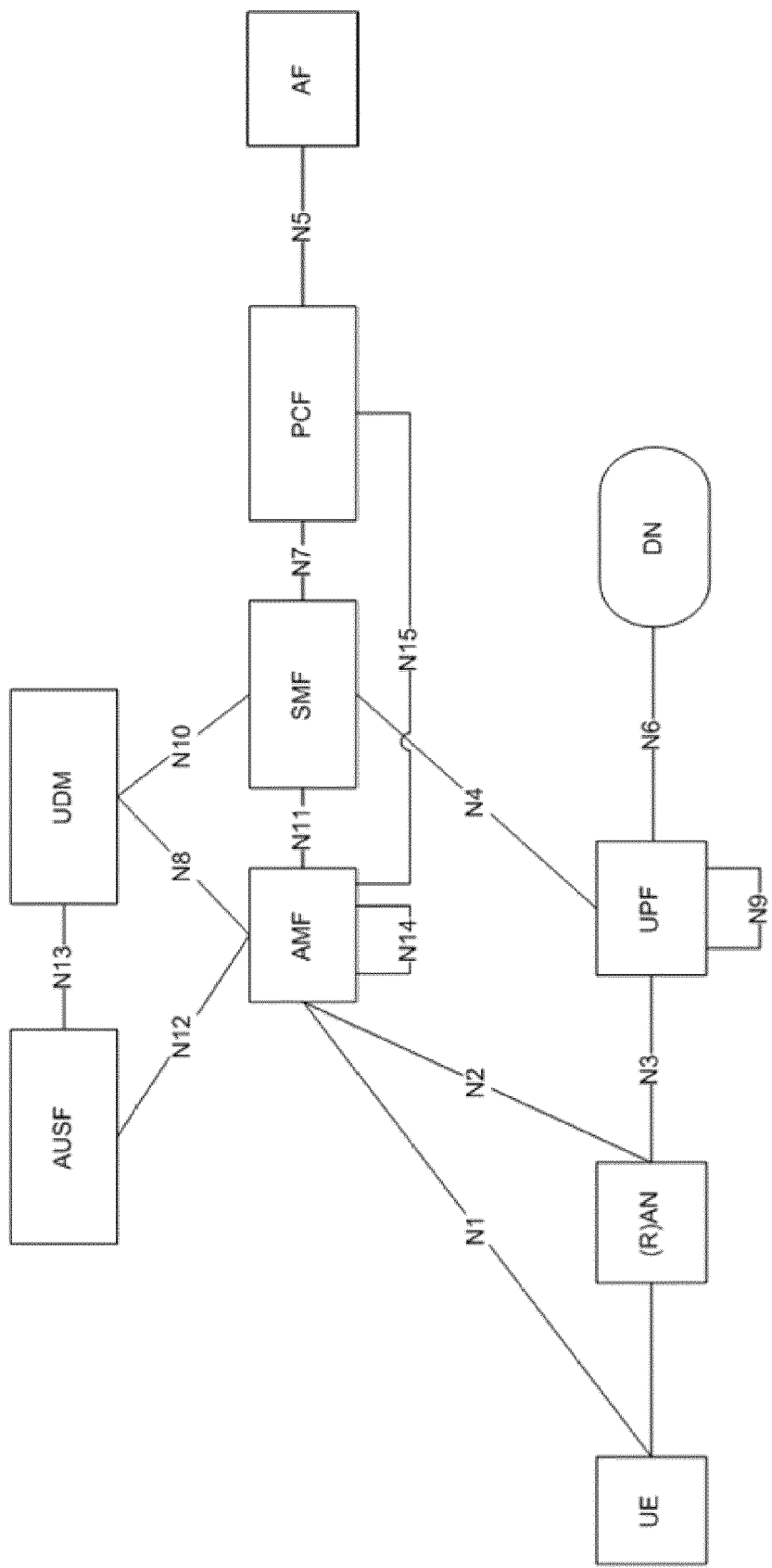
FIG. 6 is a block diagram of a New Radio (NR) wireless communication system according to some embodiments.

An NR radio access and NGC system consists of a number of different nodes and interfaces, e.g., as outlined in 3GPP TS 23.501 and as shown in FIG. 6. More particularly, in FIG. 6, a UE connects to a (radio) access network (R)AN which in turns provides the UE with access to a data network (DN) via a user plane function (UPF). Control plane functions in the core network include an access and mobility function (AMF), a session management function (SMF), a policy and control function (PCF), an application function (AF), an authentication server function (AUSF), and a unified data management (UDM) function.

The following description will focus on the RAN/Access Node and the UE and herefrom refer to the Radio access node (R)AN as a g-NodeB or a gNB for short.

Figure 7:
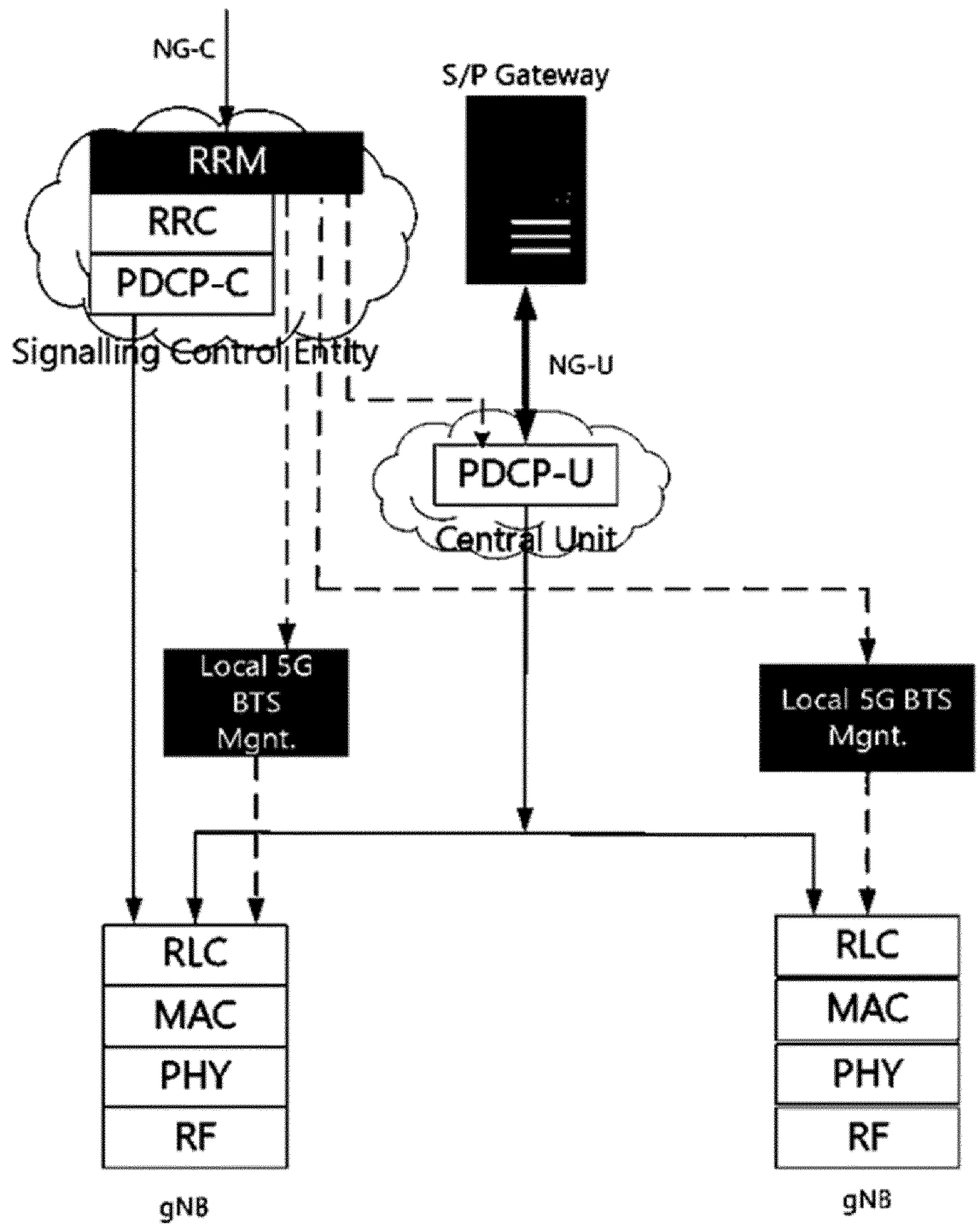
FIG. 7 is a block diagram of a wireless communication system and associated protocol layers according to some embodiments.

A deployment of a gNB includes functionality related to a number of protocol layers, such as Packet Data Convergence Protocol (PDCP), Radio Link Control (RLC) and Medium Access Control (MAC) sublayers in both a control plane (for control signaling) as well as a user plane (for user data). It should be noted that the gNB does not need to be a single physical node, but various functionality related to the supported protocols may very well be distributed over several processing units. FIG. 7 illustrates a Centralised PDCP with Centralised Radio Resource Management (RRM) in separate platforms, where PDCP-U refers to the user plane and PDCP-C refers to the control plane. See 3GPP TS 38.801.

One of the tasks for a gNB is to transmit broadcast information and it is in the Radio Resource Control (RRC) layer that broadcast information is managed.

For NR, it has been decided to divide the SI into "minimum SI" and "other SI", where the minimum SI is the SI that is required to access the cell. The minimum SI is periodically broadcast in a cell, while the other SI may be either periodically broadcast or delivered on demand, possibly triggered by a random access preamble (also referred to as Msg1) or a random access message 3 (also referred to as Msg3).

Similarly to system information in LTE, the broadcast of minimum system information may also be stored in the UE such that, if not changed, it doesn't have to be constantly re-acquired. The way this can be done is by indexing system information sets with an index or a valueTag in a similar way as described above. Then, when the UE sees a certain index being broadcast, it can correlate this with a stored index, and if the same, the system information that is broadcast is the same as the stored. If the index is different, the system information would have to be acquired again and possibly stored and associated with the new valueTag.

If system information changes frequently and it is important that UE's are informed about this, then, assuming the validity time of 3 or even 24 hours as specified in LTE, then the amount of different ways to code the valueTag index may become a limitation. If, e.g., many system information changes happen during a 3-hour period and there are fewer valueTag index codes, this may result in that some UE's have stored information associated with a valueTag index that is no longer correct, but rather updated. At the same time, there is a wish to keep the valueTag field as short as possible, as it is information that is broadcasted frequently.

According to some embodiments, the valueTag indexes are, instead of expanded to offer more different values (e.g., expanded from 5 or 6 bits field to 8-12 bits field or similar), they are specified to have different validity times. Although reference is made to a valueTag, note that embodiments are extendable to any type of indication whose value indicates whether system information is changed.

In situations when frequent system information updates occur, it makes sense to allow storage of such information in the UE, but the validity time should preferably be a lot shorter than 3 hours. With certain valueTags having a "best-before" duration that is significantly shorter than other valueTag values, some embodiments take into consideration situations when system information is rarely updated as well as situations when system information is frequently updated.

In some embodiments, at least two valueTag index values are specified for each validity time, such that the network can toggle between these two values and change broadcast information with a modification cycle corresponding to the validity time cycle and still make sure that no UE is saving outdated system information.

Figure 8:
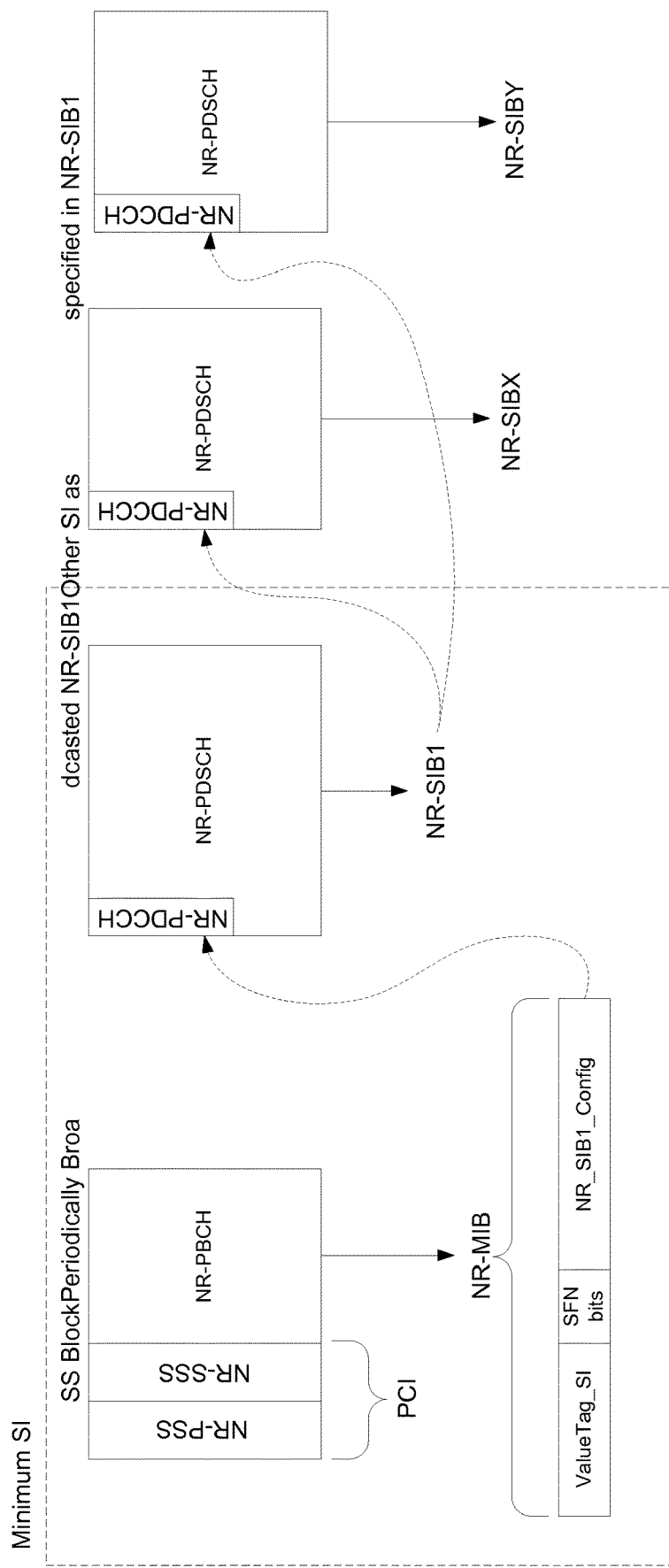
FIG. 8 is a block diagram of system information in a New Radio (NR) wireless communication system according to some embodiments.

In some embodiments as shown in FIG. 8, broadcast information is separated in a NR master information block (MIB) and NR SIB broadcast information. The NR-MIB is included in a synchronization signal (SS) block transmissions in the NR-PBCH (Physical Broadcast Channel). The NR-MIB has as a task to index other system information. MIB is transmitted on PBCH and rest on the physical downlink shared channel (PDSCH). In this regard, the NR-MIB includes information related to NR-SIB1 broadcast information.

The NR-SIB1 broadcast information may for example include all information that is necessary for a UE to read to be able to access the system and it may also point to other system information blocks, e.g., NR-SIB#, that include further information that may be less critical. Alternatively, the NR-SIB1 may only include information about other NR-SIB# and it may not provide all information that is necessary for the UE to have to access the system. Such information may instead be spread over one or several other NR-SIB#s. The NR-SIB1 then provides information about the other NR-SIBs.

Minimum system information may include information related to: system frame number (SFN), a List of public land mobile networks (PLMNs), Cell ID, Cell camping parameters, random access channel (RACH) parameters, Parameters for requesting other SI-block(s), Scheduling information for other SI, SIB type, Validity information, SI periodicity, SI-window information, Indication whether SI block is periodically broadcasted or provided on demand, and/or an Index/identifier in minimum SI to enable the UE to avoid re-acquisition of already stored SI-block(s)/SI message(s).

Consider now the SS block in FIG. 8. Firstly, the SS Block provides a physical cell identity (PCI) which is likely to be encoded as the sequence index of the NR primary synchronization signal (PSS)/secondary synchronization signal (SSS), i.e., NR-PSS/NR-SSS. Hence, in order to determine if stored SI is valid in a particular cell, the PCI can be used.

Secondly the SS Block in some embodiments may provide a NR-TSS part (not shown) that identifies a timing of the received SS Block in an SS Burst or an SS Burst Set. In case of e.g. analogue beam-sweeping there will be a relation between the TSS and the beam. SI may be dependent on a respective beam. If a multitude of beams exist, there have to be according SI available and thus an increased number of value tags is required. Hence value tags need to be flexibly and dynamically assigned.

Thirdly, the NR-PBCH contains a master information block (MIB) which also may provide one or more indexes or identifiers that can be used to determine if stored SI is valid or not. The MIB may e.g. contain a system information valueTag for this purpose, i.e., ValueTag_SI. The NR-MIB may also contain a configuration of the physical channel used to receive NR-SIB1.

Some embodiments include a valueTag in the MIB. Additionally or alternatively, an (individual) value tag may be included in one or more SIB (NR-SIB#).

Figure 9:
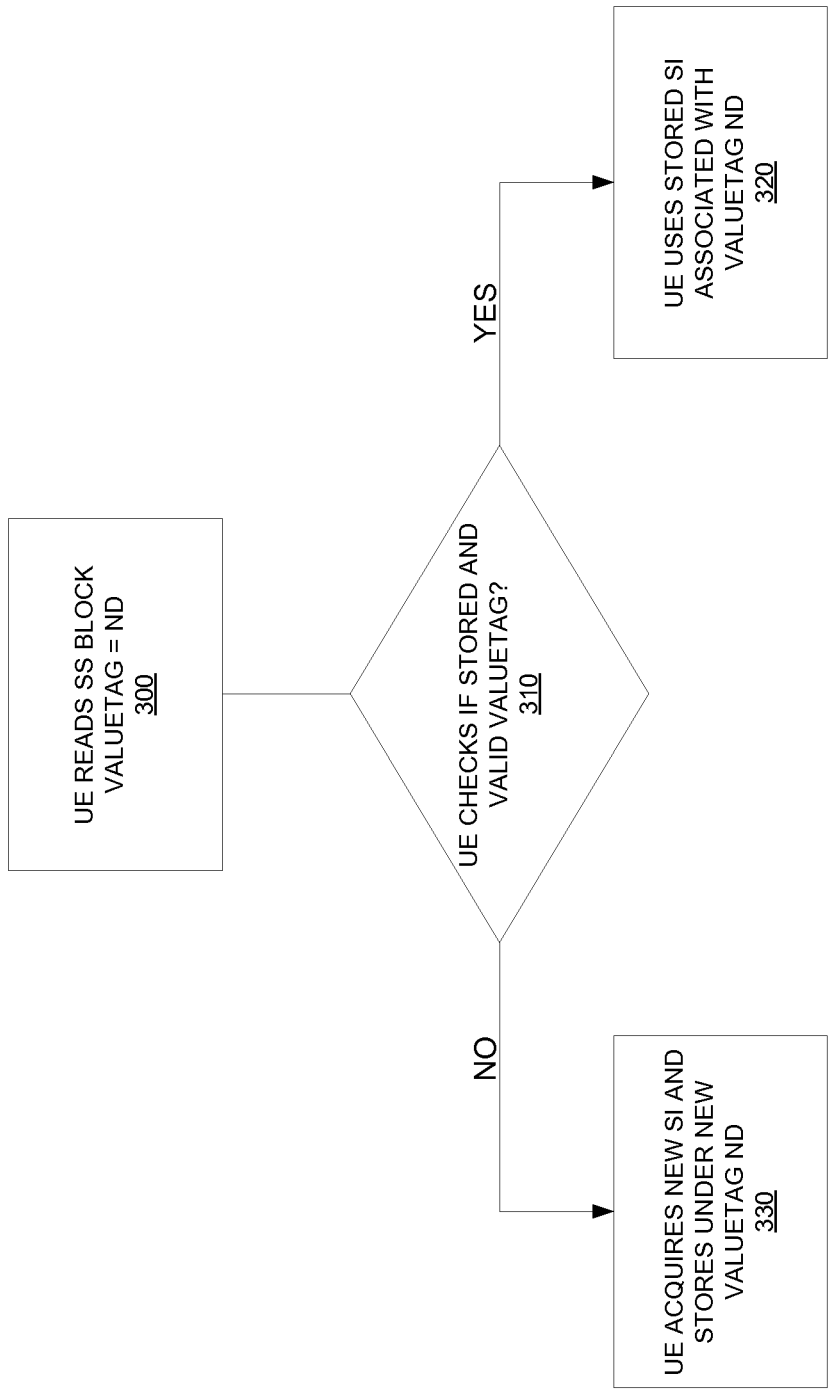
FIG. 9 is a logic flow diagram of processing performed by a user equipment according to some embodiments.

If the MIB in the SS block includes a valueTag, a UE receiving the SS block will be able to determine if a certain copy of stored system information is valid or not. FIG. 9 illustrates an example. As shown, the UE reads the SS Block and determines that the valueTag included in the MIB has a certain value, where that value is referred to here as "nd" (Block 300). The UE then checks if there is stored SI associated with a valid valueTag for the MIB (Block 310). If so, the UE uses the stored SI associated with the valueTag having a value of "nd" (Block 320). If not, though, the UE acquires new SI and stores the new SI under a new valueTag with a new value "nd" in place of the old value "nd" (Block 330).

From the gNB perspective, the gNB will assign valueTags to new configurations of system information. Consider an example shown in FIG. 10. As shown, a set of various system information configurations A-E, . . . , AF are included in a table together with a set of MIB valueTag values, assigned by the gNB. In this table, the validity time in the UE is 3 hours, no matter the validity tag used. This means that if the UE stores the configurations with the valueTag as index, it may use these up to 3 hours later as soon as the MIB includes the specific valueTag.

Note that this example shows on average 360 min/32 valuetags~6 min. So every 6 minutes a SI may be changed, which may be too few times since demands for SI change may be much higher.

Now it can be realized that there is a correlation in the valueTag range, in this case illustrated to be [0 . . . 31], and the maximum number of system information updates that can be represented by the valueTags. Assuming a 3 hour period and a 5-bit field for the valueTag indexes, it will be possible to only update the system information 31 times and still be able to assign a new value tag. After this, there is a duration of 3 hours during which a certain index, for example index 1 and SI-configuration B, should not be broadcast, to allow a new configuration to be associated with index 1, e.g., configuration BC. After these 3 hours, the validity timer has expired and the gNB can safely assume that the configuration is no longer stored in any UE and configuration B will no longer be used.

Some embodiments instead assign a specified or configured validity time for each of the valueTags (or for each subset of valueTags). FIG. 11 shows a corresponding table according to one exemplary embodiment where the MIB valueTag is 5 bits. As shown, value tags 0 and 1 have a validity time period of 10 seconds, value tags 2 and 3 have a validity time period of 1 minute, value tags 4 and 5 have a validity time period of 10 minutes, and the remaining value tags 6-31 have a validity time period of 3 hours.

Also 1 second or even below 1 second is possible. Below 1 second, though, a limit may be reached since it may take e.g. 1 ms to decode a value tag and/or its duration limit. In any event, in this table, different validity times are associated with different valueTags. In specifying different validity times, the dynamics of SI configurations will significantly increase and during the same 3 hour period, it will be possible to switch SI configuration many more times, at the cost of only a few configuration positions with the 3-hour validity cycle.

As an example, SI configuration C applies and the MIB includes the valueTag index 2. A UE that reads SI information when this index is included in the MIB will only store the system information for 1 minute and then, the next time it sees valueTag 2, if more than a minute has passed, it will again acquire the system information.

In the table, it can be noted that there are at least two valueTags for each duration. The reason for this is that if there is a need to change the SI information for a longer period, but in, e.g., 10 minute cycles, the gNB can toggle between broadcasting valueTag4 and valueTag5. This allows for leaving one of the valueTags unused but still be able to realize the 10-minute cycle, without jeopardizing that any system information that is outdated/invalid is stored in the UE. If a 10-minute cycle for system information is desired and only one valueTag has this validity, it would be difficult to change to new 10-minute-cycle information, as there could be UEs that stored the index and they will still use the stored system information associated to that index for 10 minutes, irrespective of if it is changed. To make sure this doesn't happen, a new configuration may be associated with an index that has not been used for the duration of the validityTime.

Accordingly, some embodiments herein specify different validityTimes for valueTags. Different validityTimes and in particular shorter times would allow for a more flexible handling of system information and allow the possibility to change information dynamically. With only a long duration it may be that the number of different SI combinations possible to signal would be limited, which may end up in that UE's view of system information associated to a certain index may not be correct.

A radio node herein is any type of node capable of communicating over radio signals. A radio network node 12 herein is any type of network node (e.g., a base station) capable of communicating with another node over radio signals. A user equipment 14 is any type device capable of communicating with a radio network node 12 or another user equipment 14 over radio signals. A user equipment 14 may therefore refer to a machine-to-machine (M2M) device, a machine-type communications (MTC) device, a NB-IoT device, etc. A user equipment 14 may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. It should be understood that these devices may be UEs, but are generally configured to transmit and/or receive data without direct human interaction.

In an IOT scenario, a user equipment 14 as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a user equipment 14 as described herein may be comprised in a vehicle and may perform monitoring and/or reporting of the vehicle's operational status or other functions associated with the vehicle.

Note that a radio network node 12 (e.g., a base station) as described above may perform the processing herein by implementing any functional means or units. In one embodiment, for example, the radio network node comprises respective circuits configured to perform the steps shown in FIGS. 3A and/or 4A. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more microprocessors, carries out the techniques described herein.

Figure 12B:
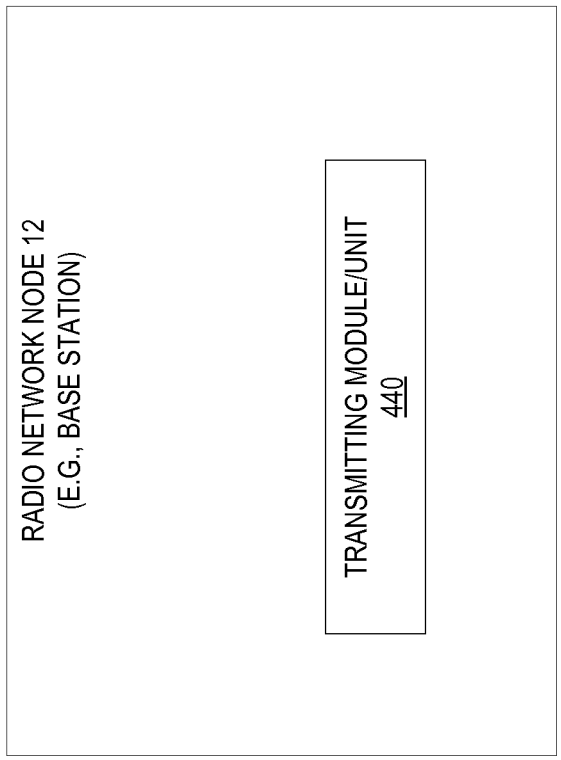
FIG. 12B is a block diagram of a radio network node according to other embodiments.
Figure 12A:
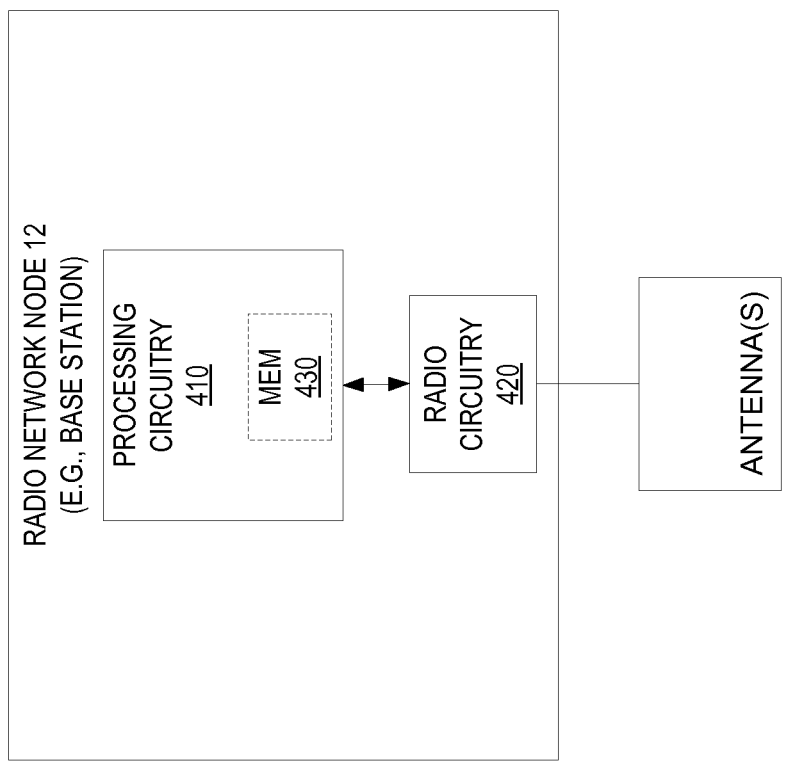
FIG. 12A is a block diagram of a radio network node according to some embodiments.

FIG. 12A illustrates additional details of a radio network node 12 in accordance with one or more embodiments. As shown, the radio network node 12 includes one or more processing circuits 410 and radio circuitry 420. The radio circuitry 420 may be configured to transmit and/or receive via one or more antennas that are internal and/or external to the radio network node 12. The one or more processing circuits 410 are configured to perform processing described above, e.g., in FIGS. 3A and/or 4A, such as by executing instructions stored in memory 430. The one or more processing circuits 410 in this regard may implement certain functional means or units.

FIG. 12B in this regard illustrates additional details of a radio network node 12 in accordance with one or more other embodiments. Specifically, the radio network node 12 may include a transmitting unit or module 440 for transmitting the system information 16 and value tag 18 as described above. One or more of these modules or units may be implemented by the one or more processing circuits 410 in FIG. 12A.

Similarly, note that a user equipment 14 as described above may perform the processing herein by implementing any functional means or units. In one embodiment, for example, the user equipment 14 comprises respective circuits configured to perform the steps shown in FIGS. 3B and/or 4B. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more microprocessors, carries out the techniques described herein.

Figure 13B:
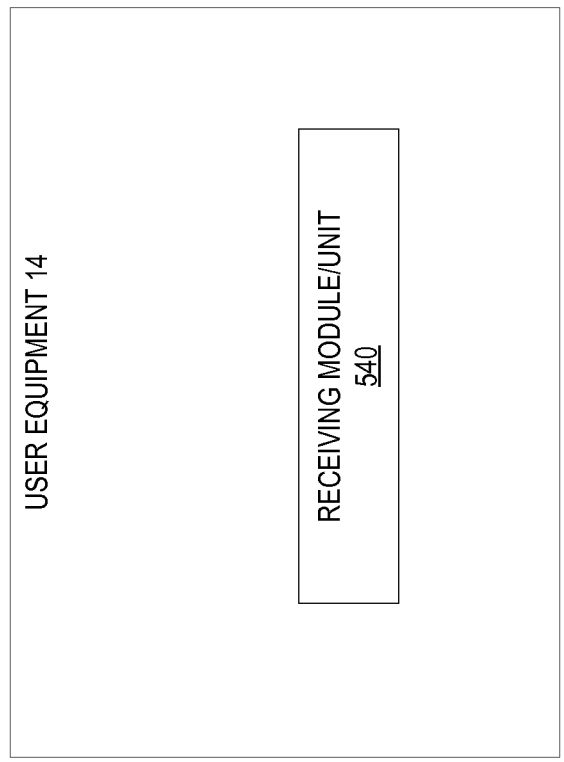
FIG. 13B is a block diagram of a user equipment according to other embodiments.
Figure 13A:
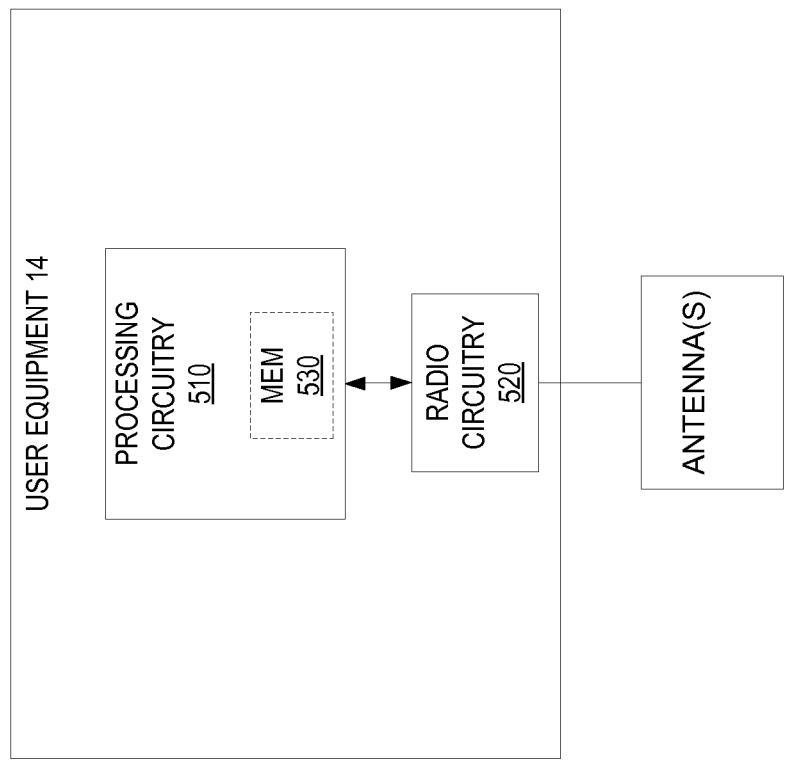
FIG. 13A is a block diagram of a user equipment according to some embodiments.

FIG. 13A illustrates additional details of a user equipment 14 in accordance with one or more embodiments. As shown, the user equipment 14 includes one or more processing circuits 510 and radio circuitry 520. The radio circuitry may be configured to transmit and/or receive via one or more antennas that are internal and/or external to the user equipment 14. The one or more processing circuits 510 are configured to perform processing described above, e.g., in FIGS. 3B and/or 4B, such as by executing instructions stored in memory 530. The one or more processing circuits 510 in this regard may implement certain functional means or units.

FIG. 13B in this regard illustrates additional details of a user equipment 14 in accordance with one or more other embodiments. Specifically, the user equipment 14 may include a receiving unit or module 540 for receiving the system information 16 and value tag 18 as described above. One or more of these modules or units may be implemented by the one or more processing circuits 510 in FIG. 13A.

Those skilled in the art will also appreciate that embodiments herein further include corresponding computer programs.

In some embodiments, for example, a computer program comprises instructions which, when executed on at least one processor of a radio network node, cause the radio network node to carry out any of the respective processing described above. In other embodiments, a computer program comprises instructions which, when executed on at least one processor of a user equipment, cause the user equipment to carry out any of the respective processing described above.

A computer program in this regard may comprise one or more code modules corresponding to the means or units described above.

Embodiments further include a carrier containing such a computer program. This carrier may comprise one of an electronic signal, optical signal, radio signal, or computer readable storage medium.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method, performed by a user equipment configured for use in a wireless communication system, the method comprising:
    receiving system information and a value tag indicating a version of the system information;
    wherein the value tag implicitly indicates a validity time period for which the version of the system information is deemed valid;
    wherein the value tag is one of multiple different possible value tags;
    wherein at least two of the different possible value tags are respectively associated with different possible validity time periods;
    wherein a table at the user equipment maps each different possible value tag to one of the different possible validity time periods;
    wherein at least two of the different possible value tags are respectively mapped to different possible validity time periods.

2. The method of claim 1, further comprising:
    responsive to receiving the system information and the value tag, storing the version of the system information;
    determining whether the stored version of the system information is valid or invalid by determining whether the validity time period has passed since storing the version of the system information; and
    selectively re-acquiring the system information depending on whether the stored version of the system information is valid or invalid according to the determining.

3. The method of claim 1, wherein at least two different possible value tags are associated with the same possible validity time period.

4. The method of claim 1, wherein the system information is minimum system information or a master information block.

5. The method of claim 1, wherein the system information is other system information than minimum system information or is a system information block.

6. The method of claim 1, wherein the system information is a system information message.

7. A method, performed by a radio network node configured for use in a wireless communication system, the method comprising:
    transmitting system information and a value tag indicating a version of the system information;
    wherein the value tag implicitly indicates a validity time period for which the version of the system information is deemed valid;
    wherein the value tag is one of multiple different possible value tags;

wherein at least two of the different possible value tags are respectively associated with different possible validity time periods;

wherein a table at the radio network node maps each different possible value tab to one of the different possible validity time periods;

wherein at least two of the different possible value tags are respectively mapped to different possible validity time periods.

8. The method of claim 7, further comprising selecting the value tag, from among the different possible value tags, based on how frequently the system information is to be updated.

9. A user equipment configured for use in a wireless communication system, the user equipment comprising:
   radio circuitry; and
   processing circuitry configured to receive, via the radio circuitry, system information and a value tag indicating a version of the system information;
   wherein the value tag implicitly indicates a validity time period for which the version of the system information is deemed valid;
   wherein the value tag is one of multiple different possible value tags;
   wherein at least two of the different possible value tags are respectively associated with different possible validity time periods;
   wherein a table at the user equipment maps each different possible value tag to one of the different possible validity time periods;
   wherein at least two of the different possible value tags are respectively mapped to different possible validity time periods.

10. A radio network node configured for use in a wireless communication system, the radio network node comprising:
   radio circuitry; and
   processing circuitry configured to transmit, via the radio circuitry, system information and a value tag indicating a version of the system information;
   wherein the value tag implicitly indicates a validity time period for which the version of the system information is deemed valid;
   wherein the value tag is one of multiple different possible value tags;
   wherein at least two of the different possible value tags are respectively associated with different possible validity time periods;
   wherein a table at the radio network node maps each different possible value tag to one of the different possible validity time periods;
   wherein at least two of the different possible value tags are respectively mapped to different possible validity time periods.

11. A non-transitory computer readable recording medium storing a computer program product for controlling a user equipment configured for use in a wireless communication system, the computer program product comprising software instructions which, when run on processing circuitry of the user equipment, causes the user equipment to:
   receive system information and a value tag indicating a version of the system information;
   wherein the value tag implicitly indicates a validity time period for which the version of the system information is deemed valid;
   wherein the value tag is one of multiple different possible value tags;
   wherein at least two of the different possible value tags are respectively associated with different possible validity time periods;
   wherein a table at the user equipment maps each different possible value tag to one of the different possible validity time periods;
   wherein at least two of the different possible value tags are respectively mapped to different possible validity time periods.

12. A non-transitory computer readable recording medium storing a computer program product for controlling a radio network node configured for use in a wireless communication system, the computer program product comprising software instructions which, when run on processing circuitry of the radio network node, causes the radio network node to:
   transmit system information and a value tag indicating a version of the system information;
   wherein the value tag implicitly indicates a validity time period for which the version of the system information is deemed valid;
   wherein the value tag is one of multiple different possible value tags;
   wherein at least two of the different possible value tags are respectively associated with different possible validity time periods;
   wherein a table at the radio network node maps each different possible value tag to one of the different possible validity time periods;
   wherein at least two of the different possible value tags are respectively mapped to different possible validity time periods.

* * * * *